(12) United States Patent
Patel et al.

(10) Patent No.: US 6,600,811 B1
(45) Date of Patent: Jul. 29, 2003

(54) EMERGENCY CALL MONITOR

(75) Inventors: Rajeshkumar Dahyabhai Patel, Naperville, IL (US); Paul Daniel Wolfson, Buffalo Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/306,952

(22) Filed: May 7, 1999

(51) Int. Cl.[7] ............................................. H04M 11/04
(52) U.S. Cl. ............................ 379/45; 379/37; 379/47; 379/134
(58) Field of Search ....................... 379/34, 111, 113, 379/133–139, 45, 9.05, 9.06, 16, 33, 9, 37, 47, 46, 48, 49, 42

(56) References Cited

U.S. PATENT DOCUMENTS

| | | | | |
|---|---|---|---|---|
| 4,455,455 A | * | 6/1984 | Little .......................... | 429/112 |
| 5,239,570 A | * | 8/1993 | Koster et al. ................ | 379/279 |
| 5,404,350 A | * | 4/1995 | DeVito et al. .............. | 370/217 |
| 5,454,025 A | * | 9/1995 | Mulrow et al. ......... | 379/221.03 |
| 5,579,368 A | * | 11/1996 | van Berkum ................ | 379/16 |
| 5,661,779 A | * | 8/1997 | Lee .............................. | 379/45 |
| 6,252,943 B1 | * | 6/2001 | Johnson et al. ............. | 379/219 |
| 6,327,342 B1 | * | 12/2001 | Mobley et al. ............... | 379/37 |
| 6,519,324 B1 | * | 2/2003 | Guevara et al. ............. | 379/45 |

OTHER PUBLICATIONS

"Emerging technologies for the control of the defense red switch network (DRSN)", Cranfill et al, 1994, IEEE, MIL-COM '94, conference record, pp. 664–668 vol. 2.*
"Alarm correlation engine (ACE)", Wu et al, 1998, IEEE, NOMS 98, pp. 733–742 vol. 3.*

* cited by examiner

*Primary Examiner*—Curtis Kuntz
*Assistant Examiner*—Barry W Taylor

(57) ABSTRACT

An emergency call monitor (110) monitors the progression of a call in a telephone switching system. The sequence of called digits for a call is detected by a line/trunk interface unit (200). A call-type processor (202) determines whether the call is an emergency call by examining the sequence of called digits and examining a call-type associated with the call. If the call is an emergency call, then a call monitor (204) is initiated to monitor the progression of the call through the telephone switch. If errors are encountered during the call, an alarm (206), including a visual and/or audible indicator, is asserted.

17 Claims, 3 Drawing Sheets

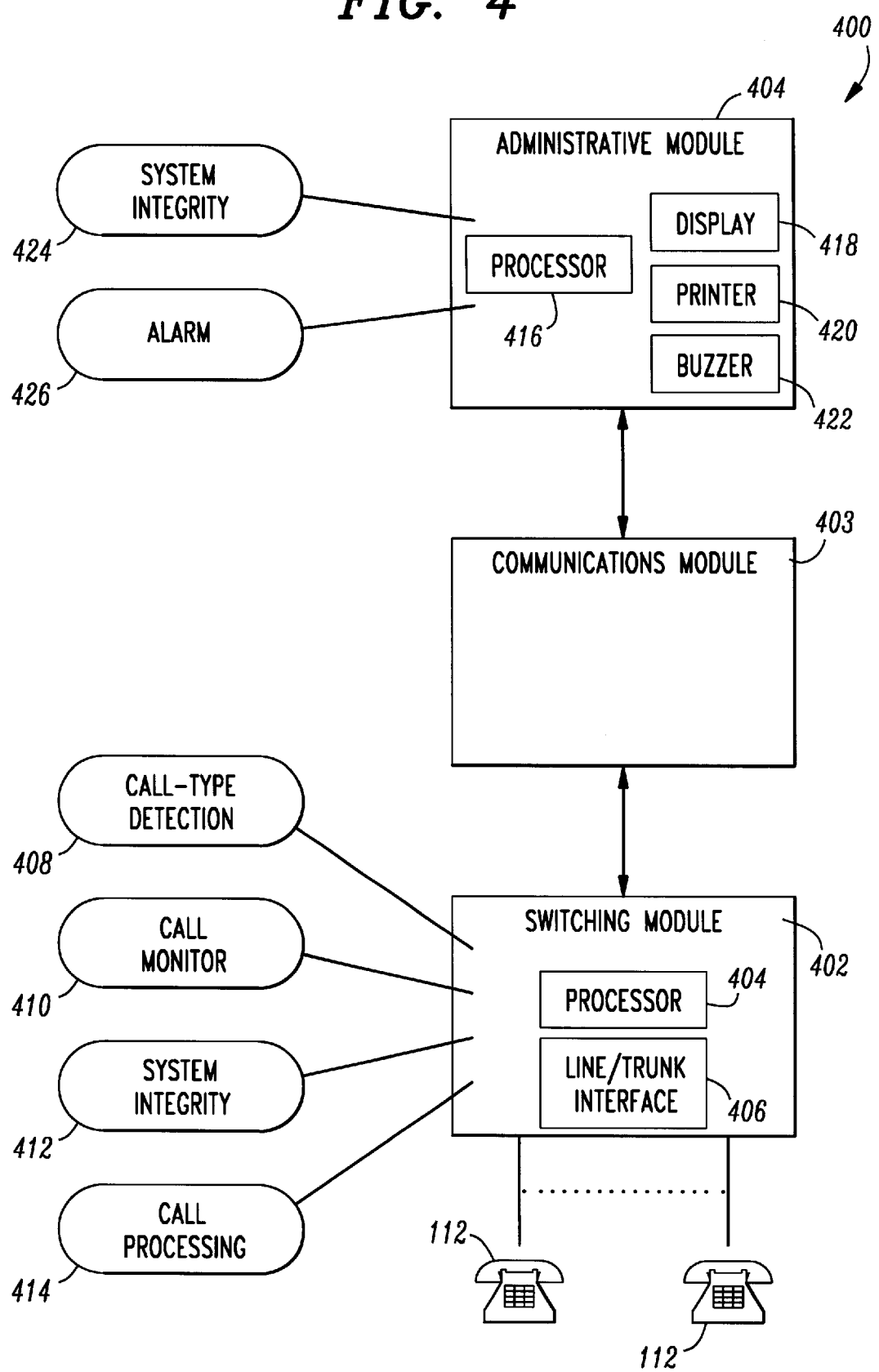

EMERGENCY CALL MONITOR

FIELD OF THE INVENTION

The present invention relates generally to telephone switching systems, and in particular to detection of failures in emergency calls placed through the telephone network.

BACKGROUND OF THE INVENTION

The public telephone network is equipped to handle certain emergency calls, which are typically initiated by dialing a special number dedicated for emergencies. For example, in the United States, 9-1-1 is dedicated for emergency calls. These calls are typically routed to a regional center of operators that handle the calls and initiate the dispatch of services needed to respond to the emergency. These services include, for example, police, fire and paramedics.

Emergency calls typically receive some special treatment in the telephone network. This treatment generally includes dedicated resources for handling the calls and specialized routing. The dedicated resources typically included lines, trunks and switching equipment.

Switching systems are known to monitor the integrity of the switching system and associated resources. However, this monitoring is done at a high level with respect to all calls traveling through the network. For example, switching systems typically monitor the number of reorders, that is, calls resulting in a fast busy. A threshold is set such that a certain number of reorders result in an alarm to indicate a possibility of error. Other limited monitoring scenarios exist, but these scenarios do not single out monitoring of emergency calls.

Unfortunately, the general monitoring of the integrity of a switching system does not adequately identify problems in emergency calls. Since emergency calls typically represent only a small percentage of all calls through a switching system, grossly monitoring all calls may not identify problems with the relatively small number of emergency calls. Indeed, it is possible that a problem with all emergency calls through a switching system may go undetected where the majority of non-emergency calls are successful. This problem is exasperated by the fact that emergency calls are often routed using dedicated resources. Thus, a problem with a dedicated resource may cause all emergency calls to fail, while non-emergency calls, which do not rely on the faulty dedicated resource are completed without error. As an example, it is possible that through some fault, all emergency trunks on a switching system are out of service, while other resources are available. Nonetheless, system integrity monitoring may not alert an operator because the total failure of all emergency calls may not result in an error threshold sufficient to assert an alarm. Of course, this is not desirable due to the potential importance of any single emergency call.

Therefore, a need exists for a method and apparatus for monitoring emergency calls in a telephone network to facilitate higher reliability in emergency calls.

SUMMARY OF THE INVENTION

In accordance with one aspect the present invention, a method is provided for monitoring emergency calls in a telephone switching system. Upon receiving a call the sequence of called digits is detected. The detected sequence of digits is examined or compared with a predetermined sequence to determine if the call is an emergency call. For example, a sequence of 911 is detected in the United States to designate emergency calls. After detecting a sequence of digits, a further determination is made as to whether the call is an emergency call. This entails examining the call type to determine if the call type is designated an emergency call. If the call is an emergency call, as determined by the dialed digits or the call type, the call is monitored to determine if the call is completed successfully. If the call is not completed successfully or encounters errors, then an alarm is generated. The method is preferably applied across all switching systems in the telephone network that handle emergency calls, thereby insuring monitoring of emergency calls from end-to-end.

In another aspect of the present invention an apparatus is provided for monitoring emergency calls. The apparatus includes a line/trunk interface unit that interfaces telephone lines and/or trunks into a telephone switching system. The line/trunk interface unit receives a telephone call. A call digit processor is coupled to the line/trunk interface unit to detect the called digits associated with the call to determine if the called digits are a predetermined sequence indicating an emergency call. A call monitor is coupled to the call digit processor to monitor the calls determined to be emergency calls. If errors occur during the processing of the emergency calls, then the call monitor provides an indication of the error and an alarm is asserted.

BRIEF DESCRIPTION OF THE DRAWINGS

FIG. 4 is a block diagram of a preferred embodiment of a switching system with an emergency call monitor in accordance with the present invention.

DETAILED DESCRIPTION OF THE PREFERRED EMBODIMENTS

Figure 1:
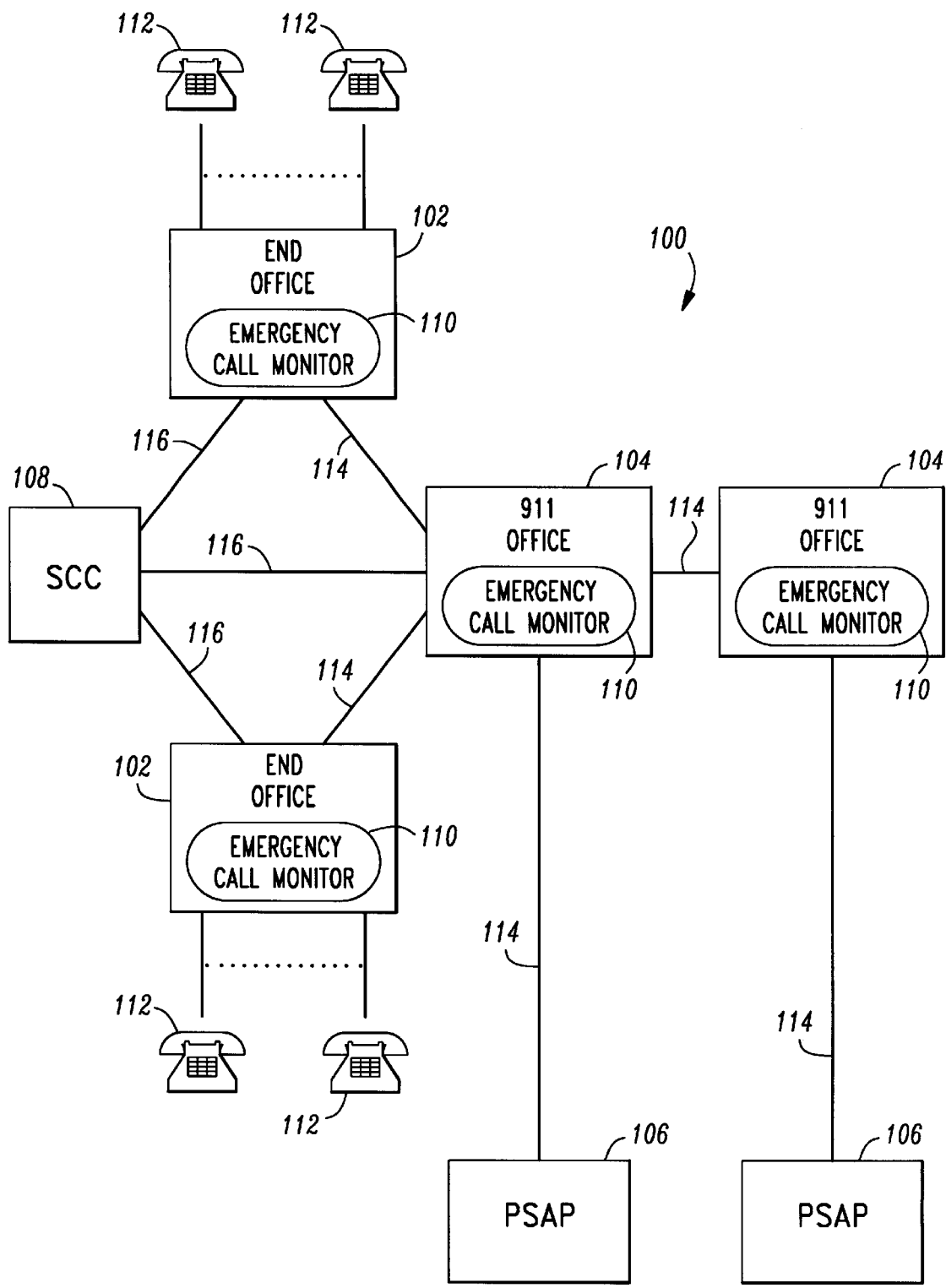
FIG. 1 is a block diagram of a telephone switching network including emergency call monitors in accordance with the present invention.

FIG. 1 is a block diagram of a telephone switching network 100. Telephone switching network 100 is a partial depiction of a portion of the public telephone switching network. Network 100 includes end offices 102, 911 offices 104, public safety answering points (PSAP) 106 and switching control center (SCC) 108. Each of the end offices 102 and 911 offices 104 contains an emergency call monitor 110 in accordance with the present invention. End offices 102, 911 offices 104 and PSAPs 106 are coupled to communicate with each other via trunks 114. In addition, end offices 102 and 911 offices 104 are coupled to communicate with switching control center 108 via a data network 116.

End offices 102 are telephone switching systems that are coupled to the public telephone network to receive and switch telephone communication and provide ancillary services. Typically end offices 102 have connections to telephones 112, other switching systems, such as other end offices or 911 offices, and switching control center 108. In general, end offices 102 receive and process telephone calls. In a preferred embodiment, end office 102 is implemented with a 5ESS 2000 switching system from Lucent Technologies Inc.

The 911 office 104 is also a telephone switching system for receiving and switching telephone calls and providing ancillary services. Typically, 911 office 104 is a tandem switch with only trunk connections and no direct line connections to telephones. The 911 office 104 includes connections to other 911 offices, end offices 102, switching control center 108 and public safety answering point 106.

Public safety answering point 106 is a switching system with operator stations for handling emergency phone calls. Typically, public safety answering point 106 includes a telephone switch with trunk interfaces for receiving calls from a 911 office and operator stations coupled to the switching system for voice communications and display of information.

Switching control center 108 is a computer or processor that collects information from telephone switches and also may be used to control certain functions on telephone switches.

Trunks 114 are shown interconnecting various switching systems in network 100. A wide variety of trunks are employed for this function including CAMA (centralized automatic message accounting) trunks and SS7 (signaling system 7) trunks. Alternatively, other telephone trunk or line interfaces are used.

In accordance with the present invention, end offices 102 and 911 offices 104 include an emergency call monitor 110. Emergency call monitor 110 detects an emergency call and monitors that call for certain errors. If errors are detected, then the emergency monitor sets a visual or audible alarm.

Figure 2:
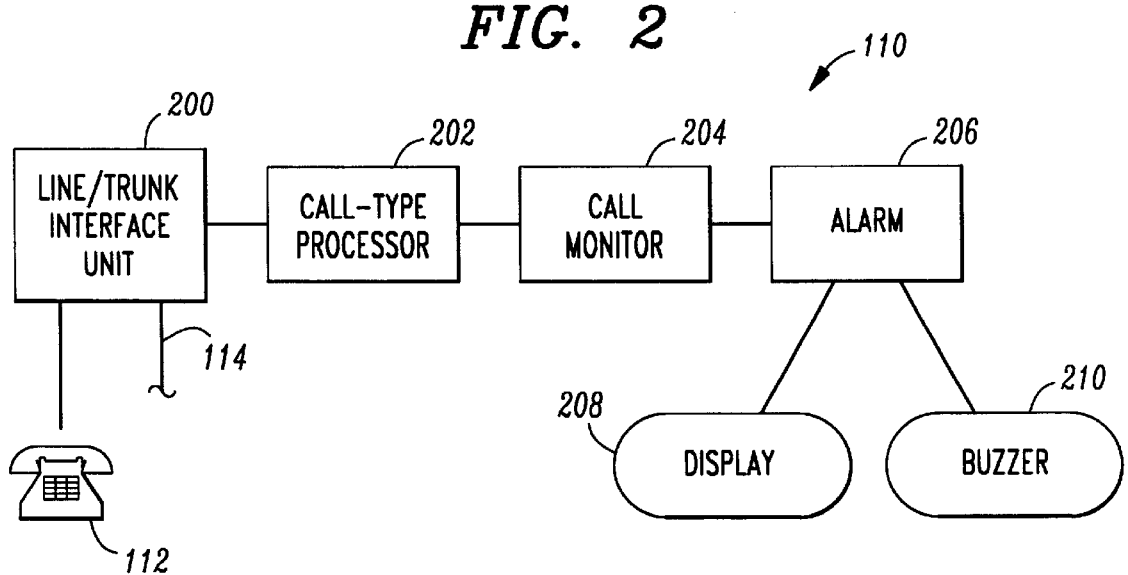
FIG. 2 is a block diagram of an emergency call monitor in accordance with the present invention.

FIG. 2 is a block diagram of call monitor 110. Call monitor 110 includes a line/trunk interface unit 200, a call-type processor 202, a call monitor 204, and alarm 206 including a display 208 and buzzer 210.

Line/trunk interface unit 200 interfaces the switching system with telephones 112 and/or trunks 114. Line/trunk interface unit 200 provides the physical connection between the switching system and the physical communications media transmitting the call. Line/trunk interface unit 200, among other things, detects the signals representing the called digits associated with a call and also a call type that may be associated with the call.

Call-type processor 202 is coupled to line/trunk interface unit 200. Call-type processor 202 receives the called digits associated with a call and also the call type associated with a call from line/trunk interface unit 200. Call-type processor 202 compares the called digits to a predetermined sequence of called digits to determine if the call is an emergency. For example, in a preferred embodiment employed in the United States, call type processor 202 compares the called digits with "911" to determine if the call is an emergency type call. Also call-type processor 202 examines the call type associated with the call to determine if the call is of type emergency. In a preferred embodiment, call-type processor 202 is implemented as a combination of software and hardware, including, alternatively, a programmed microprocessor and combinatorial and sequential logic.

Call monitor 204 is coupled to call-type processor 202 and activated to monitor a particular call when call-type processor 202 determines that a call is of an emergency type. Call monitor 204 interfaces with call processing software typically associated with a normal telephone call to track the progression of the call and record any errors. The type of errors tracked includes, for example, busy reorder and route failures such as translation errors and trunks unavailable.

Alarm 206 is triggered if call monitor 204 determines an error occurred in processing a call of emergency type. In response to an indication of error, alarm 206 may display a message indicating the error on display 208 or set an audible alarm or buzzer 210. In a preferred embodiment, alarm 206, is implemented as a combination of software and hardware, including interfaces to display 208 and buzzer 210. Most preferably, alarm 206 is implemented by using existing alarm resources on a telephone switching system.

Figure 3:
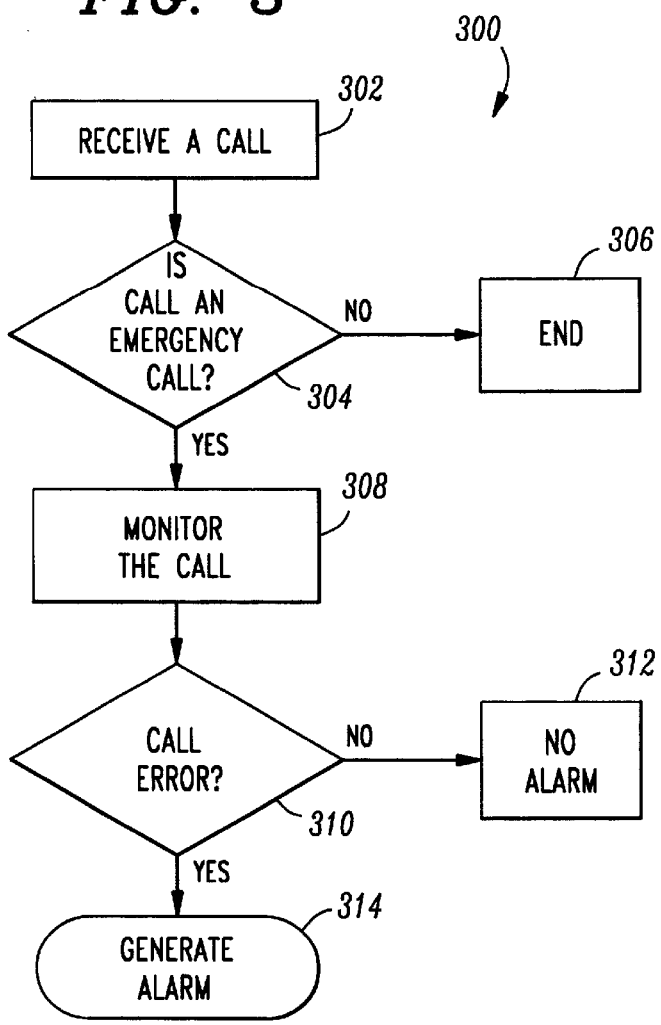
FIG. 3 is flow chart illustrating a method for monitoring emergency calls in accordance with the present invention.

FIG. 3 is a flow chart 300 illustrating the operation of emergency call monitor 110. The operation of call monitor 110 is described in conjunction with flow chart 300 below with the referenced steps of flow chart 300 shown parenthetically.

First, a call is received by line/trunk interface unit 200 (302). The call may originate from telephone 112 or may be received over a trunk interface 114. The call may be from a customer's direct telephone line or from a switching system in the telephone network. The called digits and call type associated with the phone call are received in the normal manner.

Then call-type processor 202 determines whether the call is an emergency call (304). Call-type processor 204 determines whether the call is an emergency call by determining whether the sequence of called digits represents and emergency number and also by determining whether the call type is of type emergency. In a preferred embodiment, if either of these conditions is true, then the call is an emergency call. If the call does not meet either of these conditions, then the call is not an emergency call and the emergency call monitor takes no further action (306). If the call is determined to be an emergency call, then the call-type processor 202 initiates the call monitor 204 to take appropriate steps to monitor completion of the call (308).

Once initiated, call monitor 204 tracks the normal progression of the call processing procedure. If an error occurs in call processing, the call monitor notes the error and also the number of call attempts made resulting in error (310). Errors that are detected include (1) all 911 trunks are out of service; (2) incorrect translation of all program data; (3) all trunks are busy; or (4) alternate public safety answering point routing failure. If no errors are detected then no alarm is generated and the call monitor terminates (312). On the other hand, if an error is detected, an alarm is generated (314).

FIG. 4 is a block diagram of preferred embodiment of a switching system 400 for implementing an emergency call monitor in accordance with the present invention. Switching system 400 receives, switches and transmits telephone calls over line and or trunk interfaces. System 400 is often referred to as a central office switch. Most preferably, system 400 is a 5ESS 2000 available from Lucent Technologies Inc. Switching system 400 is programmable, including software and hardware components for operation.

System 400 includes a switching module 402, a communications module 403 and an administrative module 404. Switching module 402 performs local switching and control functions and interfaces to subscriber lines and trunks. Communications module 403 serves as a distribution hub for switching voice, control information and synchronization signals. Administrative module 404 provides system-wide administration, maintenance and resource allocation. The modules of system 400 communicate with each other over network control and timing links. Though one each of the switching module 402, communications module 403 and administrative module 404 are shown, multiple modules are alternatively employed for additional resources or to enhance reliability.

Switching module 402 includes a processor 404 for executing software code, and a line/trunk interface unit 406.

Though processor 404 is shown as a single processor block, processor 404 is alternatively, a single or multiple processors interconnected. Similarly, line/trunk interface unit 406 is shown as one block but may consist of multiple components or a single component capable of interfacing with multiple line and trunk physical devices. Switching module 402 runs software programs in order to receive, switch and transmit telephone calls. In a preferred embodiment of the present invention, switching processor 402 includes four software modules: call-type detection 408, call monitor 410, system integrity 412 and call processing 414.

Administrative module 404 includes a processor 416, a monitor or display 418, a printer 420 and a buzzer 422. Administrative processor 404 runs a number of software programs to implement its function. In a preferred embodiment for implementing the present invention, administrative processor 404 includes two software modules: system integrity 424 and alarm 426.

In the switching module 402, call-type detection 408 determines the call type by examining the called digits and call type retrieved by line/trunk interface unit 406. As discussed above, this may entail comparing the called digits to a predetermined sequence of digits associated with an emergency call or may entail determining whether the call is of an emergency call type. If the call is of an emergency call type as determined by call-type detection module 408, then call monitor 410 is executed. Call monitor 410 interfaces with call processing module 414 to monitor whether there are errors associated with the processing of the call. If the call processing is successful, then no errors are reported. Successful completion generally entails switching the call from the switching system 400 to another switching system, such as a 911 office. If errors are detected by call monitor 410 as determined during the call processing process, then system integrity module 412 is alerted that there were errors. In the preferred embodiment both the number of attempts and the number of errors are recorded.

In the administrative processor 404, system integrity module 424 checks for messages from system integrity 412 of switching module 402 to determine if errors occurred on the switching module associated with an emergency call. If errors did occur then the alarm module is executed. In the preferred embodiment, system integrity module 412 checks for error messages from call monitor 410 every 5 minutes. Similarly, system integrity module 424 checks for error messages from system integrity module 412 every 5 minutes. This advantageously allows determination of an error within about 10 minutes.

If alarm module 426 is executed to indicate an alarm, then an audible and/or visual alarm is generated. In the preferred embodiment the alarm is printed on a printer and displayed on a monitor and an audible buzzer 422 is triggered. Also, alarm 426 sends a message to a system control center for reporting.

The emergency call monitor described herein provides timely monitoring of emergency calls through the telephone network. This addresses the inadequacy of present indiscriminatory monitoring of all calls. The advantages are readily apparent when considering the shortcomings of only a single incomplete emergency call.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for monitoring an emergency call in a telephone switching system comprising the steps of:

A) detecting a predetermined sequence of called digits for a call;

B) determining whether the call is an emergency call by determining whether the predetermined sequence of called digits match a sequence of called digits associated with an emergency call;

C) if the call is an emergency call, then monitoring call processing executing on the telephone switching system associated with the call to determine if the call is completed successfully; and D) generating an alarm if the call is not completed successfully.

2. The method of claim 1 wherein the predetermined sequence of called digits is 911.

3. The method of claim 1 wherein the step of generating an alarm further comprises generating an alarm if all emergency trunks are one of busy and out of service the call is not completed successfully if the call encounters an error in emergency trunks.

4. The method of claim 3 wherein the error in the emergency trunks is one of busy and out of service.

5. The method of claim 1 wherein the alarm comprises a visible alarm.

6. The method of claim 5 wherein the visible alarm comprises a message on a printer.

7. The method of claim 5 wherein the visible alarm comprises a message on a display.

8. The method of claim 1 wherein the alarm comprises an audible alarm.

9. The method of claim 1 wherein the step of monitoring the call further compromises monitoring the progression of the call to determine if any errors are encountered.

10. The method of claim 1 wherein the step of determining whether the call is an emergency call further comprises determining whether a call type associated with the call indicates that the call is an emergency call.

11. The method of claim 1 wherein the step of generating an alarm further comprises generating an alarm if alternative public safety answering point routing fails for the call.

12. An emergency call monitor in a telephone switching system comprising:

a line/trunk interface unit that receives a telephone call;

a call digit processor coupled to the line/trunk interface unit to detect a predetermined sequence of called digits and a predetermined call type associated with the telephone call, wherein the predetermined sequence of called digits and the predetermined call type identify an emergency call;

a call monitor that is coupled to the call digit processor to monitor call processing executing on the telephone switching system associated with telephone calls that have one of the predetermined sequence of called digits and the predetermined call type, the call monitor providing an indication of a failure if a monitored phone call is not completed successfully; and an alarm that is activated when the call monitor indicates a failure in the monitored phone call.

13. The monitor of claim 12, wherein the call monitor provides the indication of failure when all emergency trunks are one of busy and out of service.

14. The monitor of claim 12, wherein the predetermined sequence of called digits is 911.

15. The monitor of claim 12, wherein the alarm comprises a visible alarm.

16. The monitor of claim 15 wherein the visible alarm comprises a message on at least one of a printer and display.

17. The monitor of claim 12 wherein the alarm comprises an audible alarm.

* * * * *